J. ALLISON.
INDUSTRIAL CAR.
APPLICATION FILED JUNE 1, 1920.
1,368,681.
Patented Feb. 15, 1921.
2 SHEETS—SHEET 1.
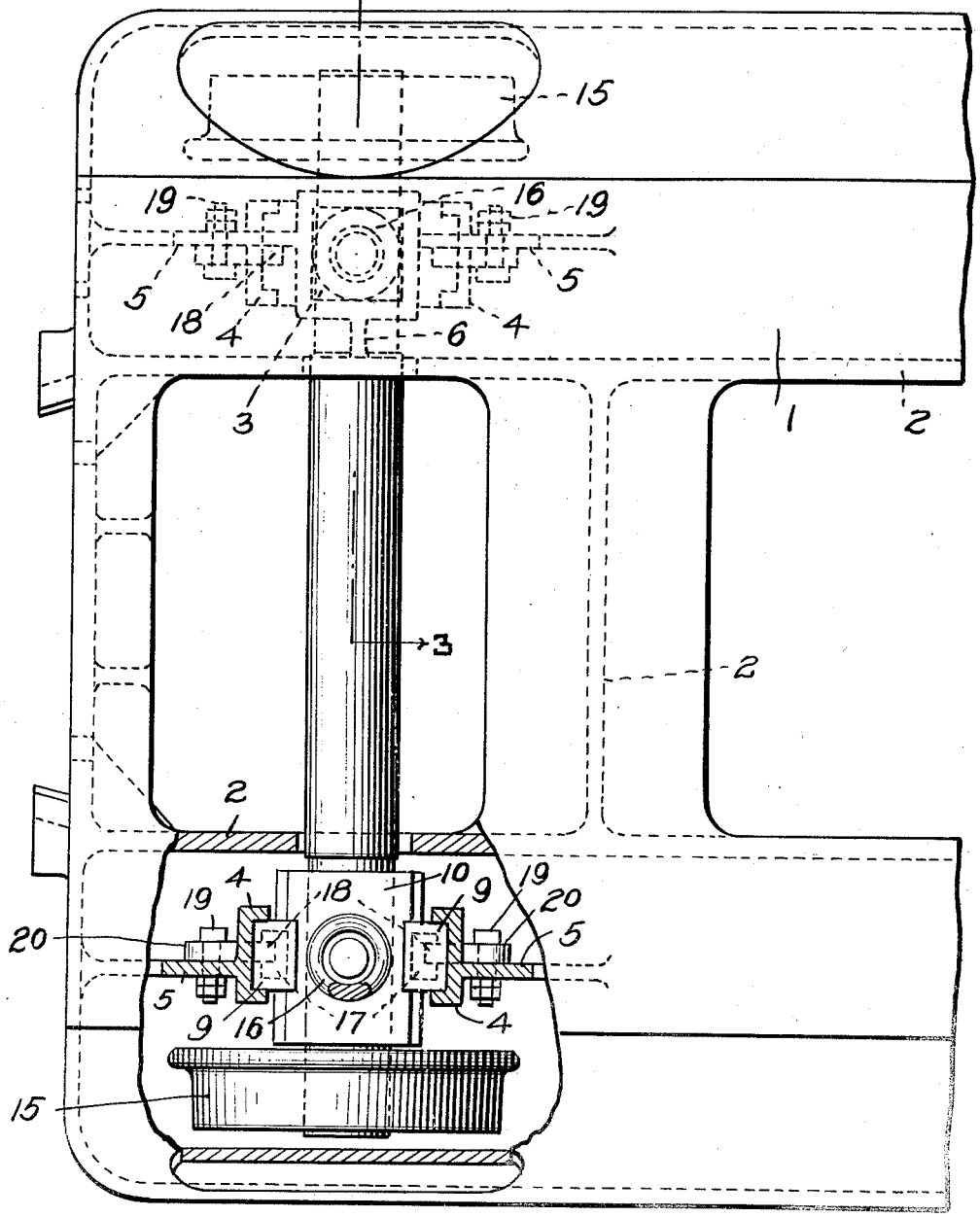
WITNESSES
J. Herbert Bradley.
INVENTOR
John Allison,
By Hunter & Brown
Attorneys J. ALLISON.
INDUSTRIAL CAR.
APPLICATION FILED JUNE 1, 1920.
1,368,681.
Patented Feb. 15, 1921.
2 SHEETS—SHEET 2.
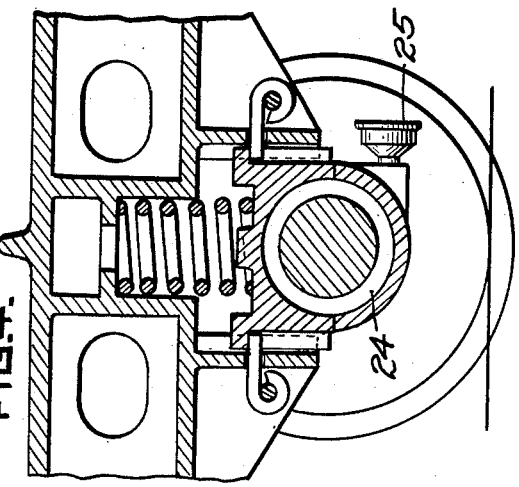
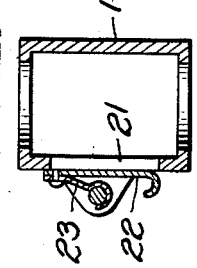
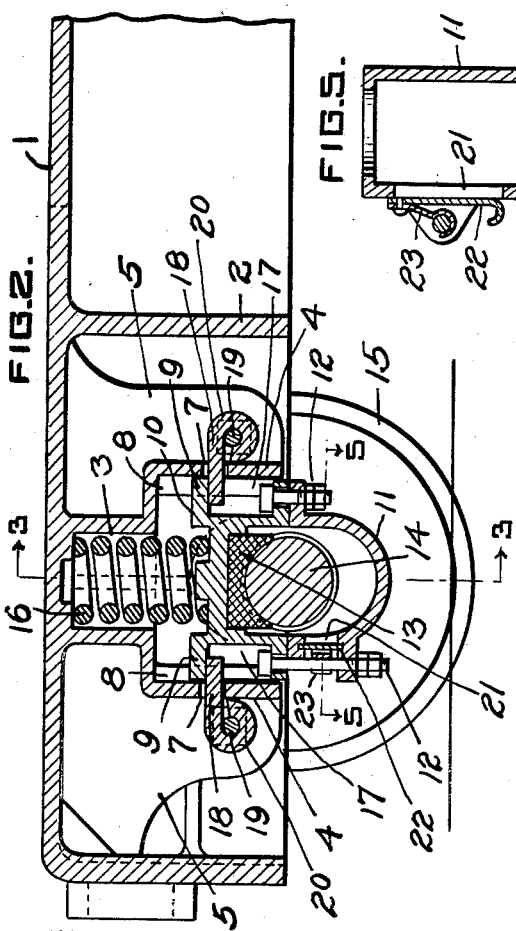
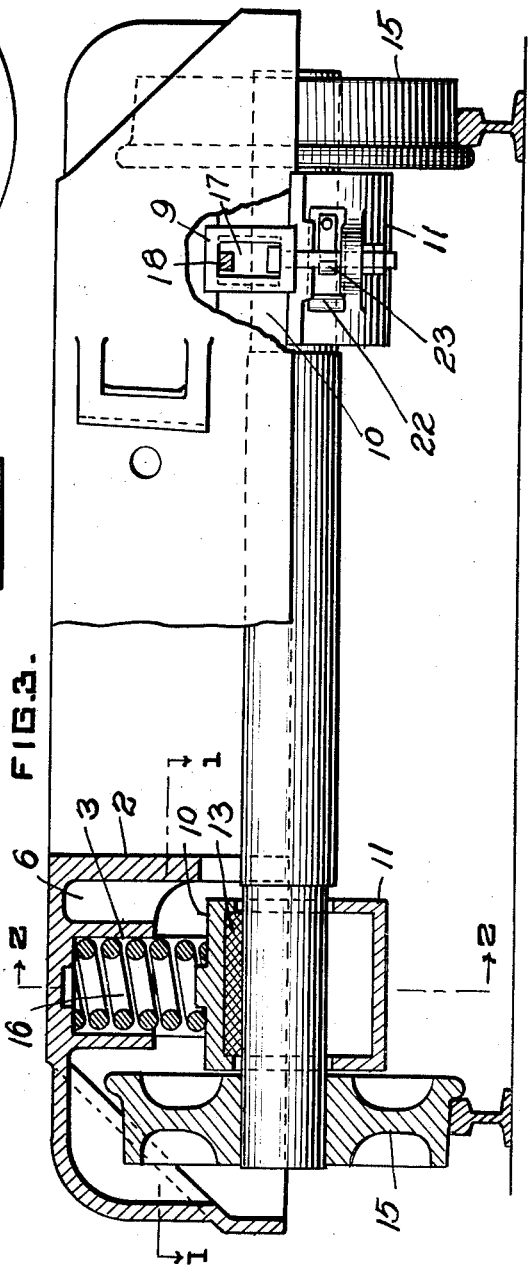
WITNESSES
J. Heber Bradley.
INVENTOR
John Allison,
By Winter & Brown,
Attorneys

UNITED STATES PATENT OFFICE.

JOHN ALLISON, OF DRAVOSBURG, PENNSYLVANIA, ASSIGNOR TO PITTSBURGH STEEL FOUNDRY COMPANY.

INDUSTRIAL CAR.

1,368,681.  Specification of Letters Patent.  Patented Feb. 15, 1921.

Application filed June 1, 1920. Serial No. 385,612.

*To all whom it may concern:*

Be it known that I, JOHN ALLISON, a citizen of the United States, a resident of Dravosburg, in the county of Allegheny and State of Pennsylvania, have invented a new and useful Improvement in Industrial Cars, of which the following is a specification.

This invention relates to small cars such as used in industrial plants for carrying products from one part of the plant to another. Its object is to provide a journal box construction and mounting for such cars so arranged that the journal box, axles and wheels can be readily removed, yet nevertheless securely held in place, and so arranged that the journal box and holding means are not liable to injury.

Steel and other industrial plants make use of small cars for conveying products from one part of the plant to another. Instances of these are billet cars, ingot cars, charging cars, pit cars and the like used in steel plants. Many other plants use cars of a similar nature. Such cars must operate on tracks in which the clearances are small and in proximity to many heavy operations which are likely to injure the car. Most of these cars are designed to carry heavy loads. Consequently, the wheel base must be as wide as possible to give stability to the car. On account of the restricted clearances, outside journal boxes are not practical. Furthermore, outside journal boxes are liable to injury due to the many heavy objects and heavy machinery moved and operated in proximity to the tracks. Inside journal boxes are generally objectionable because of inaccessibility and difficulty in removing the wheels and axles from the car body.

The present invention covers a construction of car frame or body with inside journal boxes with the parts so arranged that the journal boxes are securely attached to the frame or body, yet readily removable therefrom, are properly guided in the frame or body, and are accessible for inspection and lubricating.

In the accompanying drawings Figure 1 is a top plan view of one end of an ingot car showing the invention applied thereto, a part thereof being broken out to the horizontal section indicated by the line 1—1, Fig. 3; Fig. 2 is a vertical longitudinal section on the line 2—2, Fig. 1; Fig. 3 is in part a vertical transverse section on the line 3—3, Fig. 1, and in part an end view partly broken away; Fig. 4 is a transverse sectional view illustrating a modification; and Fig. 5 is a vertical longitudinal section on the line 5—5, Fig. 2.

The body or body frame of the car will be constructed to adapt it to the particular use for which the car is intended. As illustrated, the body is formed as an integral casting which is a common practice in cars of the character specified, the same comprising a top 1 with suitable depending flanges 2 to strengthen the same. Cast integrally with the frame, on each side thereof and projecting downwardly therefrom are pockets 3 which extend downwardly to form pedestals 4 for receiving and guiding the journal boxes. The pockets and pedestals are braced by suitable longitudinal webs 5 and transverse webs 6. The pedestals 4 are provided with openings 7 and on their inner faces are shown as recessed, as at 8, to receive lateral projections 9 on the journal boxes. The journal box is formed in two parts, towit a top portion 10 provided with the lateral projections 9 and a bottom section or cellar 11. These two sections are secured together by any suitable means, such as the bolts 12. Seated in the top of the journal box is a bearing or brass 13 resting upon the axle 14, just inside of the wheel 15. The box as a whole is vertically movable in the pedestals, this movement being resisted by a helical spring 16 in the pocket 3 and interposed between the top of the frame and the top of the box. To hold the boxes in place their lateral projections 9 are recessed, as at 17, and are engaged by the inner ends of stop or retaining members 18 which project through the holes 7 in the pedestals and are detachably secured to the webs 5 by means of bolts 19 projecting through eyes 20 formed on the outer ends of said stops or retaining members. The boxes have a vertical movement equal to the distance between these stops and the top of the pedestals and this movement is cushioned by spring 16.

The lower portion 11 of the journal box forms a cellar for containing waste and a lubricant, which can be inserted through opening 21 on the outer side of the box member 11 and which opening is closed by a slide 22 provided with a spring clip 23 having a notched portion to engage one of the bolts 12 to secure said slide against accidental movement.

Fig. 4 shows a modification of the form of the box and the shape of the pedestals. The box here shown is not provided with a bearing or brass, but is provided with an annular roller or like bearing 24, and with a grease cup 25 for forcing a lubricant into the bearing. The box however, is guided and retained in place by means substantially the same as those shown in the other views.

In the construction illustrated and described the journal boxes are completely housed and protected by the car body or frame. The boxes are securely guided in the frame, are permitted a sufficient vertical movement, and are securely held against escape from the frame. They can nevertheless be readily removed, together with the axle and wheels, by merely removing the bolts 10 and withdrawing the stops or retainers 18.

I claim:—

1. In a car, the combination with a frame or body, pedestals projecting downwardly therefrom, a journal box in said pedestals and provided with lateral projections, a spring interposed between the top of the box and the frame, an axle journaled in said box, a wheel on said axle outside of said box and pedestal, and a retaining member detachably secured to the frame and projecting through the pedestal and extending underneath a lateral projection on the journal box.

2. In a car, the combination with a frame or body, pedestals projecting downwardly therefrom, a journal box guided in said pedestals and provided with lateral projections, a spring interposed between the top of the box and the frame, an axle journaled in said box, a wheel on said axle outside of said box and pedestal, and a pair of retaining members detachably secured to the frame and projecting through the pedestals and extending underneath the lateral projections on the journal box.

3. In a car, the combination with a frame or body provided with longitudinal webs, pedestals projecting downwardly from said body, a journal box guided by the pedestals and provided with lateral projections, a spring interposed between the top of the box and the frame, an axle journaled in said box, a wheel on said axle outside of said box and pedestal, and a retaining member detachably secured to a frame web and extending through a pedestal and underneath a lateral projection on the journal boxes.

4. In a car, the combination with a frame or body, pedestals projecting downwardly therefrom, webs bracing said pedestals, a journal box guided by the pedestals and provided with lateral projections, a spring interposed between the top of the box and the frame, an axle journaled in said box, a wheel on said axle outside of said box and pedestal, and a retaining member detachably secured to a pedestal-bracing web and extending through a pedestal and underneath a lateral projection on the journal box.

5. In a car, the combination with a frame, spring pockets and pedestals projecting downwardly therefrom, longitudinal webs bracing said pedestals, a journal box guided in the pedestals and provided with lateral projections, a spring seated in said pocket and bearing on the journal box, an axle journaled in said box, a wheel on said axle outside of said box and pedestal, and a retaining member secured to a pedestal-bracing web and projecting through a pedestal and extending underneath a lateral projection on the journal box.

6. In a car, the combination with a frame, pedestals projecting downwardly therefrom, a journal box guided in said pedestals and provided with lateral projections, a spring interposed between the top of the box and the frame, an axle journaled in said box, a wheel on said axle outside of said box and pedestal, means for limiting the downward movement of the journal boxes in said pedestals, said journal boxes being formed of an upper and lower member, and means for securing said two members together.

7. In a car, the combination with a frame or body provided with pedestals arranged to lie between the wheels of the car, a journal box in said pedestal and having its lower portion formed as a lubricant and waste container and having an opening in its side, a removable cover for said opening, and a notched clip for securing said cover in place.

8. In a car, the combination with a frame or body provided with pedestals arranged to lie between the wheels of the car, a journal box in said pedestals, said journal box being formed in an upper and a lower section, vertical bolts securing said sections together, the lower section of said box being provided with a side opening, a sliding cover closing said opening, and a notched yielding clip on said cover arranged to engage one of said bolts to hold the cover in place.

In testimony whereof, I have hereunto set my hand.

JOHN ALLISON.

Witness:
PEARL WALKER.